United States Patent [19]

Vadasz et al.

[11] 4,201,455
[45] May 6, 1980

[54] LASER-OPERATED APPARATUS FOR DATA AND SIGNAL RECORDING

[75] Inventors: Peter Vadäsz; Szabolcs Tökés; Attila L. Márkus; Károly Balazs; Endre Pólya, all of Budapest; András Tallér, Solymár; András Podmaniczky, Budapest, all of Hungary

[73] Assignee: MTA Szamitastechnikai es Automatizalasi Kutato Intezet, Budapest, Hungary

[21] Appl. No.: 857,189

[22] Filed: Dec. 2, 1977

[30] Foreign Application Priority Data

Dec. 15, 1976 [HU] Hungary ............................. MA 2841

[51] Int. Cl.² ............................................. H04N 5/84
[52] U.S. Cl. ................................................. 350/358
[58] Field of Search .................... 350/358; 331/94.5 M

[56] References Cited
U.S. PATENT DOCUMENTS

| Re. 29,670 | 6/1978 | Spaulding | 350/358 |
| 4,084,182 | 4/1978 | Maiman | 350/358 |

Primary Examiner—William L. Sikes
Attorney, Agent, or Firm—Karl F. Ross

[57] ABSTRACT

A laser-operated apparatus for data and signaling recording makes use of a laser-beam source whose laser beam is directed at the Bragg angle into a tellurium dioxide monocrystal provided with an array of ultrasonic transducers, each of which is energized independently by at least one amplitude modulated very high frequency carrier. The individual transducer segments generate respective beams within the body of the crystal which, upon emerging, represent individual information channels which are separately controllable to provide the data and information recordal.

1 Claim, 4 Drawing Figures

LASER-OPERATED APPARATUS FOR DATA AND SIGNAL RECORDING

FIELD OF THE INVENTION

The invention relates to a laser operated apparatus for data and signal recording comprising a laser light source, a multi-channel acousto-optical intensity modulator (preferably also serving as an active beam distributing means); a beam deflecting system synchronized with said modulator, light-sensitive information recording means, passive optical elements for directing the laser beams, and control means for coordinating the operation of the apparatus.

BACKGROUND OF THE INVENTION

As it is known, the more economical operation of recently available fast-working computers necessitates rapid recordal of the computer output data. Such output data are recorded mainly by line printers, but the significance of microfilm operated output systems is always increasing. The most widely used fast line printers are either of the mechanical or of the electrostatic types. The maximum speed of the faster electrostatic line printers is about 6000 lines/min. These line printers are very expensive and their manufacture is complicated. In microfilm systems the characters are displayed on the screen of a cathode ray tube and from here the characters are imaged by an optical system with a large aperture to the recording microfilm. The speed of such systems can be as high as 30,000 lines/min.

Because of their different operational principles the character generators of the two above mentioned systems cannot be interchanged. Laser operated character generators, besides their high speeds (about 50,000 to 150,000 lines/min), have the great advantage that they can be used both for line printers and for microfilm outputs; this changeover requires only the simple replacement of their output optics.

There is an apparatus known (for instance produced by Siemens (AG), in which the multi-directional deflection of a laser beam is carried out by a rotating polygon-shaped mirror, while the intensity modulation and the generation of the vertical column of a character point matrix are performed by a multi-channel acousto-optical modulator.

The operation of the multi-channel modulator is based on the selectivity of the acousto-optical Bragg diffraction. More particularly when several oscillator output signals with different frequencies are coupled to a single ultrasound transducer of an acousto-optical cell simultaneously, there will be as many deflected outgoing laser beams as there are oscillators. These deflected beams can be spatially separated from each other and their intensity can easily be modulated almost independently by changing the output powers of the oscillators. The multi-channel modulator requires the use of an amplitude adder which is a complicated device and a high power linear amplifier. The controlling electronic circuitry become particularly complicated and expensive when the number of the channels, for improving the character quality, exceeds about 10 or 20.

In laser-operated line printer produced by IBM the intensity modulation is effected magneto-optically the line-directional deflection is carried out by a rotating polygonal mirror, and the generation of the characters occurs within the point matrix by lines i.e. on a miniraster. This makes the synchronization complicated and expensive, while due to the sequential mode of operation the bandwidth of the modulator should be high.

In a line printer produced by the RCA corporation the generation of the characters occurs in minirasters (altogether 19 pieces). This has the same drawbacks as mentioned in connection with the IBM system.

There are also known systems designed for producing microfilms such as the laser-operated character generators of Datalight Inc., of Stromberg Datagraphix Inc., and of the 3M Co., the operation of these systems is similar to that of the Siemens system with the exception that the line-directional deflection is carried out by a swinging mirror. The characters are composed on a $7\times 5$ or $9\times 7$ point matrix.

Due to the use of an adder-type multi-channel modulator, the number of raster points in the column direction (7 and 9) within the point matrix cannot be noticably increased further economically. The further improvement of the quality of the characters can be reached only by generating miniraster based characters which is both complicated and expensive.

OBJECT OF THE INVENTION

The object of the invention is to provide a laser operated character generator by which the quality of the characters can be further increased without a miniraster mode, which comprises comparatively a few optical elements of commercial quality, has a simple mechanical construction and can be manufactured economically.

SUMMARY OF THE INVENTION

The basic principle of the invention lies in the fact that a multi-segmented ultrasound transducer is provided in the multi-channel intensity modulator, and to the respective ultrasound transducing segments a control unit is coupled which excites the associated segment by a compound very high frequency signal having discrete component frequencies and this unit adjusts the amplitudes of the component frequencies by gating according to predetermined conditions.

BRIEF DESCRIPTION OF THE DRAWING

The invention will now be described in connection with an exemplified embodiment in which reference is made to the accompanying drawings.

In the drawings.

SPECIFIC DESCRIPTION

Figure 1:
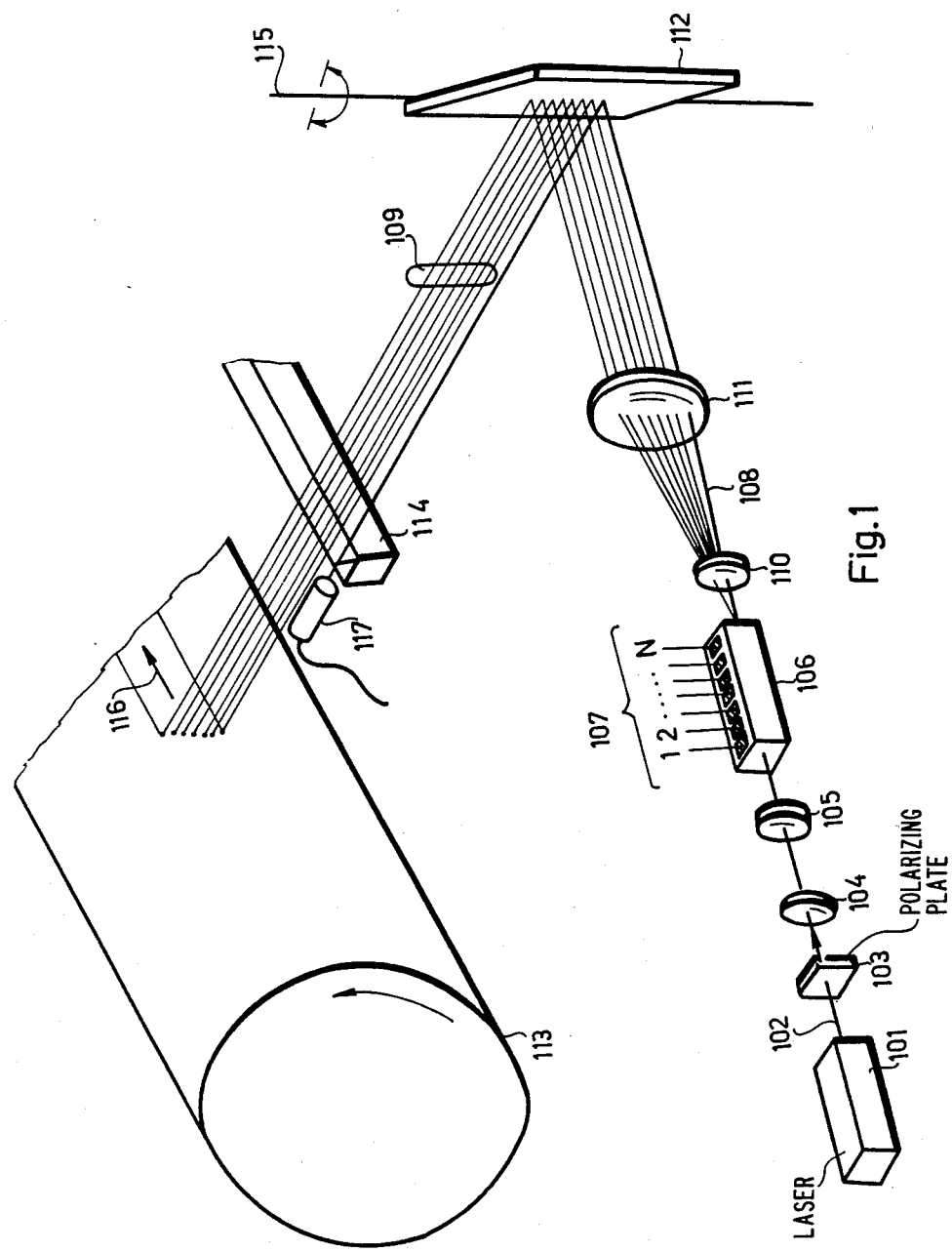
FIG. 1 is a diagrammatic perspective view of a preferred embodiment of the laser-operated character generator according to the invention.

Referring now to FIG. 1 a laser 101 is shown producing an output beam 102 which after passing through a polarization forming plate 103 passes through confocal telephoto optics consisting of a collecting lens 104 and a dispersing lens 105.

The beam diameter decreases by the ratio of the focal distances of the collecting lens 104 and the dispersing lens 105 whereupon the beam passes through a multi-channel intensity modulator 106, at the same time the neck of the beam, which has a Gaussian intensity distribution, gets longer, whereby the beam diameter will be nearly constant below each of the 1, 2, ... N ultrasound transducer segments 107 of the intensity modulator 106. The undeflected and deflected beams 108 and 109 leaving the multi-channel intensity modulator 106 pass through beam-expanding optics consisting of diverting and collecting lenses 110 and 111 and are reflected by a swinging mirror 112. After being reflected from the mirror the beams fall on a so-called copying cylinder 113 of an electrostatic copying device which rotates with a constant angular speed and is coated with a photoconductive layer. The size of each of the raster points thus formed depends on the diameter of the beams leaving the lens 111, on the optical path-length measured between the lens 111 and the cylinder 113 and on the wavelength of the laser. The lenses 104, 105 and 110 can be of average commercial quality, while the lens 111 should be a normal camera objective with a focal length to diameter ratio of at least 2.8. By moving the camera optics along the beam path the vertical size of the characters can be changed. As this optics is arranged ahead of the swinging mirror 112, the line length will be unchanged during such movements. The undeflected laser beam with the exception of an angular extremity is fully covered by a knife-edge bar 114 during its full scanning range, whereby it cannot reach the cylinder. The swinging mirror 112 swings around an axis 115 with an angular amplitude of 10° to 30°. Due to this swinging movement the deflected beams move along the generatrix of the cylinder 113 in the direction of the arrow 116. By modulating the intensity of the respective deflected beams in a properly synchronized way with the movement of the swinging mirror 112, a series sequence of characters can be produced along the generatrix of the cylinder; the characters also can be imaged on a screen, or can be used for producing an alphanumerical display. The time-dependence of the angular displacement of the swinging mirror 112 can be either saw-tooth shaped and sinusoidal. In case of sinusoidal movements the quasi-linear section of the sine curve around the zero-crossing can be used for generating characters. A small apertured photo detector 117 arranged beside the vertical end face of the knife-edge bar 114 detects the undeflected but by the swinging mirror 112 periodically diverted laser beam 108 and provides respective pulses at the instances when the swinging mirror 112 is in the corresponding angular extreme position. These pulses are used for the synchronization of the multi-channel intensity modulator 106.

It should be noted that instead of the swinging mirror 112 a polygon-shaped mirror or an acousto-optical light deflecting means can also be used. In this latter case both in front and behind the deflecting means respective additional supplementary beam-forming optical elements should be provided. In the place of the copying cylinder any other light-sensitive material (e.g. microfilm) can be used.

The operation of the multi-channel intensity modulator 106, by which excellent character quality can be attained, will be described in connection with FIG. 2.

The laser beam 102 is directed into a tellurium dioxide monocrystal 118 in a direction corresponding to the crystalline indices of (001). The crystal plate normal to the direction defined by the crystalline indices of (110) a shear oscillating ultrasound transducer 107 is provided comprising N separate segment pieces. A compound high-frequency signal is coupled to each of these segments generated by the proper superposition of the output signals of n separate VHF oscillators 119 (very high frequency oscillators). The output signals of these oscillators 119 are transferred after passing through respective gates 120 and dynamic level equalizers 121 to inputs of adders 122 and from the outputs of the adders 122 through power amplifiers 123 to the ultrasound transducing segments. The frequencies of the oscillators 119 are substantially evenly distributed within their operational frequency range (e.g. in connection with a wave-length of 6328 A of a He-Ne laser this range can be between 20 and 60 Mc/s).

In the tellurium dioxide crystal above the respective segments n separate phase-lattices will be formed being superimposed onto each other.

The incoming laser beam incident upon the crystal in the so called Bragg angle will be deflected with angles corresponding to the respective frequencies coupled to the individual segments, whereby separate outgoing beams 109 are generated. The intensity of any one of these outgoing beams can be modulated or controlled, independently of the intensity of the other beams, by a control signal coupled to control inputs 124 of the gate 120 and the dynamic lever equalizer 121 associated with that particular beam. On the basis of practically realizable crystal sizes and of acousto-optical calculations N can be even as high as 120. The maximum value of n is limited by economic considerations. Supposing the still economical values for n to be about 3 to 5, the maximum number of channels can reach even N×n=60 to 100. When using 20 to 30 channels the quality of the characters is almost as good as it is in normal printing.

Figure 2:
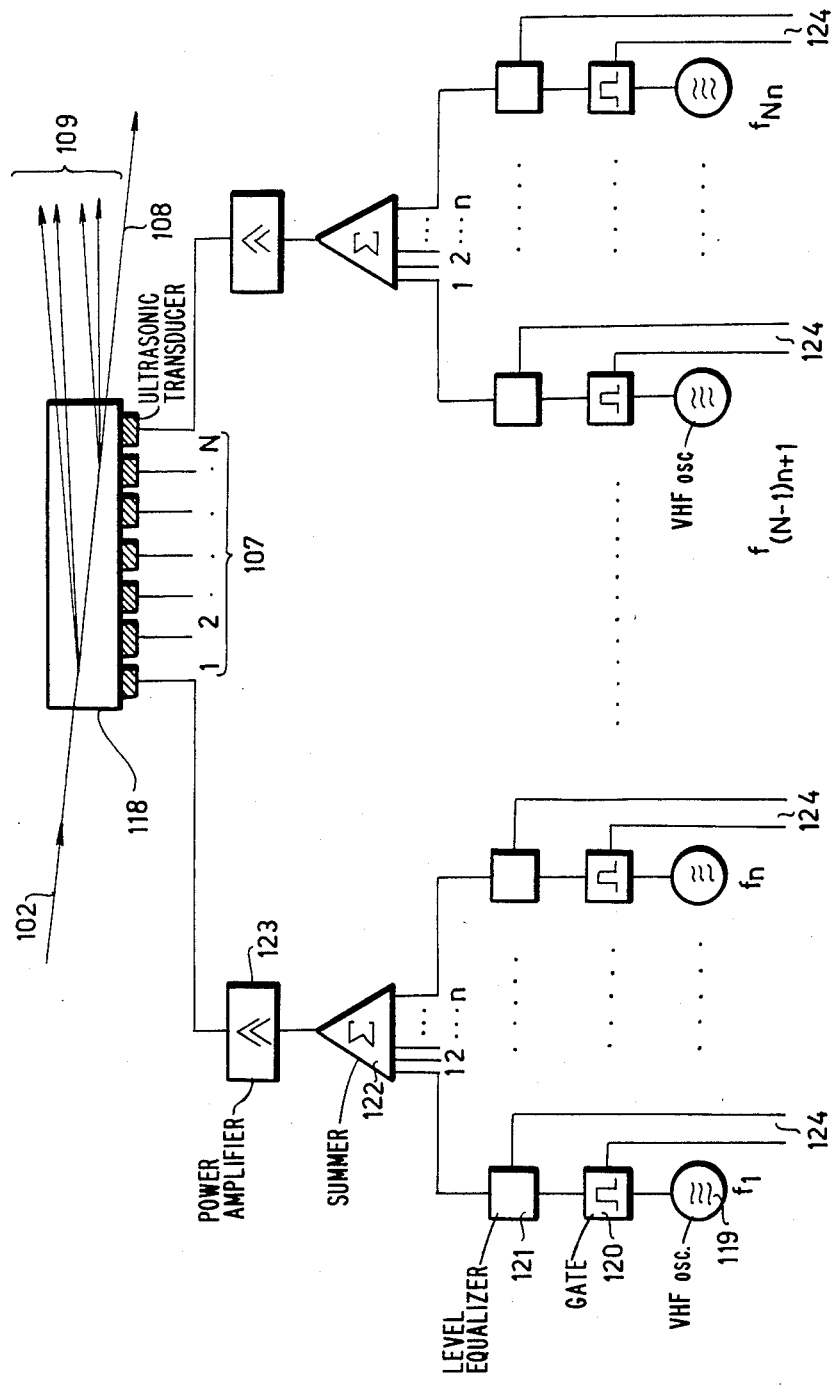
FIG. 2 is an electric block diagram of the control circuits of the multi-channel intensity modulator.
Figure 3:
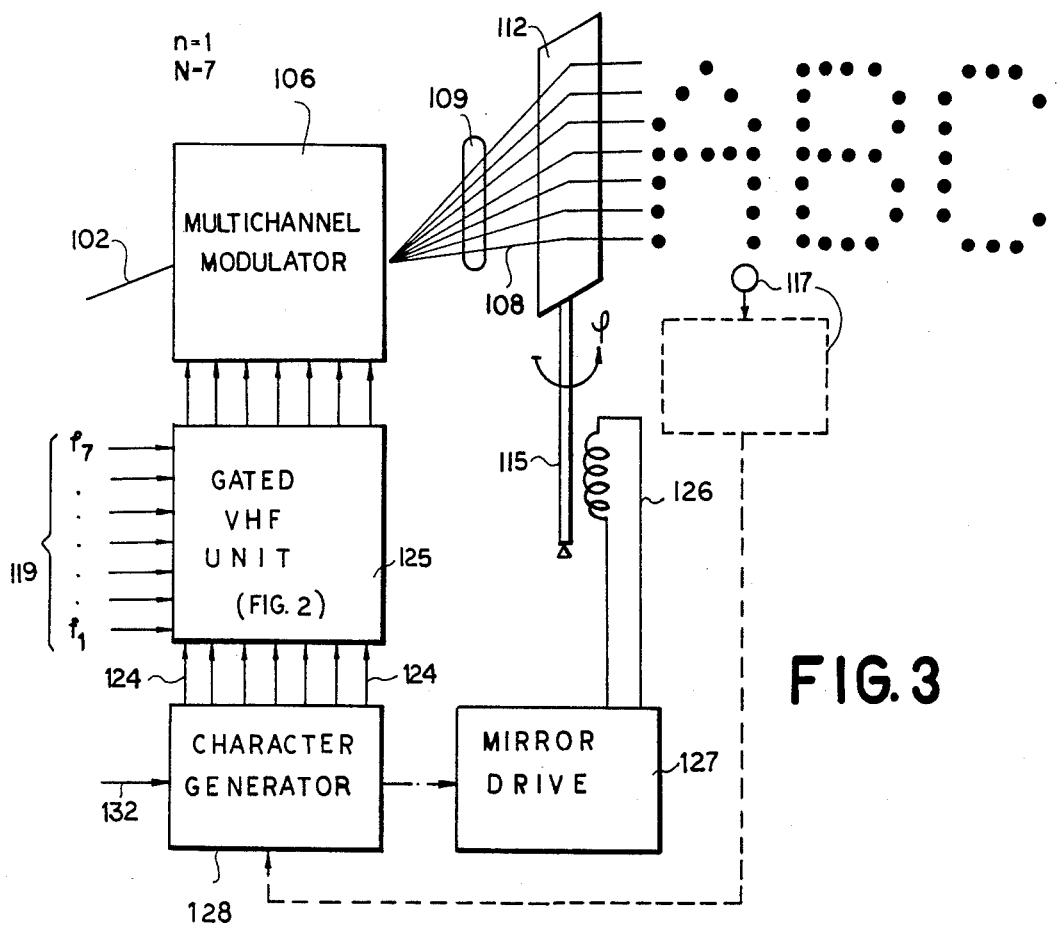
FIG. 3 shows the block diagram of the control circuits of the character generator.

The control of the character generator shown in FIG. 3 occurs by means of a gated VHF unit 125 with adjustable gain and this unit 125 comprises the gates 120, the dynamic level equalizers 121, the adders 122 and the power amplifiers 123 shown in FIG. 2.

Figure 4:
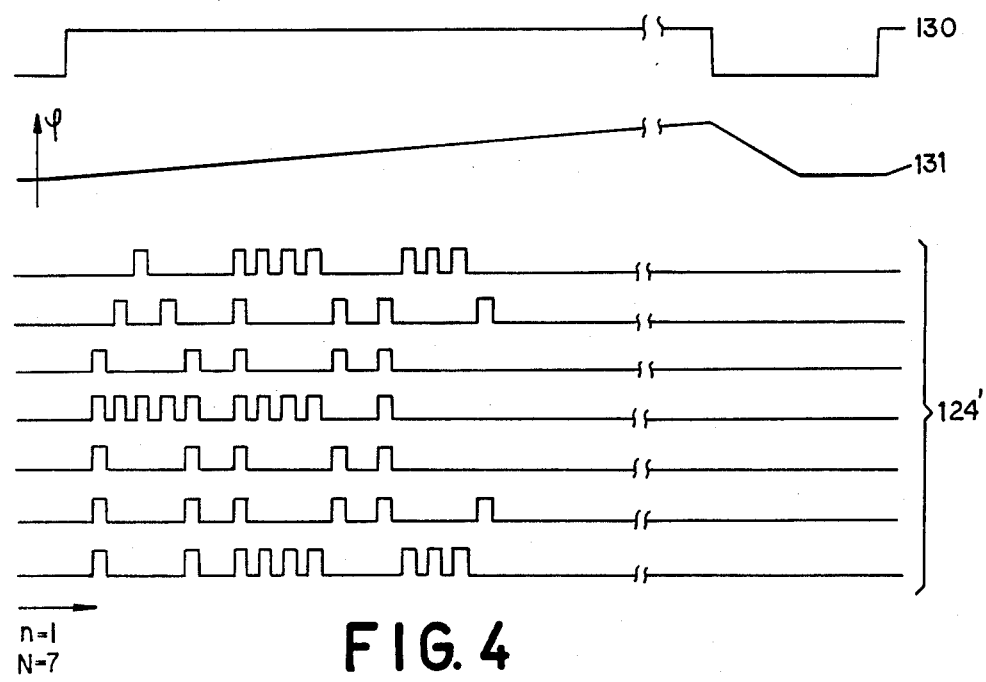
FIG. 4 is a graph of timing diagrams characteristic to the operation of the circuits shown in FIG. 3.

The control inputs 124 are driven by a digital character generating unit 128 wih gating pulses 124 shown in FIG. 4, and in response to such control signals the units 125 controls the multi-channel intensity modulator 106 to produce the deflected beams 109 defining the columns of the point-matrix. The syncronization between the swinging mirror and the multi-channel modulation can be of either of two alternatives. In the first version a synchronizing signal delivered by the photo detector 117 (FIG. 1) triggers the reading of the character content from the digital character generating unit 128. According to the second version it is the digital character generating unit 128 that produces a starting signal for an electronic driving unit 127 adapted to drive the swinging mirror 112 by energizing a deflecting coil 126 for the swinging mirror, so that the deflection of the swinging mirror starts simultaneously with the reading of the characters.

The starting signal 130 of the electronic driving unit 127 and a time diagram 131 corresponding to the momentary angular position of the swinging mirror 112 are also illustrated in FIG. 4. The signals 124' shown in FIG. 4 correspond to an example for n=1 and N=7 as defined in connection with FIG. 2.

The circuit arrangement shown in FIG. 3 has a data transfer channel input 132 which, when the apparatus is used as line printer or as a computer output to microfilm or as a plotter, provides through an interface an operational connection with the computer.

It should also be noted that the arrangement shown in FIG. 1 is somewhat modified in a computer output to microfilm mode because an additional lens system is arranged directly behind the swinging mirror 112 which, depending on the actual width of the microfilm, scales down the line-width (and proportionally therewith also the size of the raster points) to be between about 0.5 to 5 centimeters.

The focal surface of this additional lens system is preferably a planar surface but depending on the manner in which the microfilm is guided it can be a spherical surface too.

In plotter mode only one of the channels of the multichannel modulator 106 is used, and the recording of the picture information to be displayed is carried out in separate raster lines. The control can be received from a computer, from a television camera, or from any other suitable data or signal generating device.

What is claimed is:

1. A laser-operated apparatus for data and signal recording comprising:
    a laser light source generating a collimated laser beam;
    an acousto-optical light intensity modulator in the path of said collimated laser beam for producing a plurality of outgoing laser beams angularly separated in a first deflection plane, said modulator including a body transparent to the light of said beams, said outgoing beams being separately intensity modulatable for each to represent a respective information channel; transducer means coupled to said body of said acousto-optical light intensity modulator and comprising a plurality of separately controllable ultrasonic transducer segments arranged in a linear array in the direction of laser beam propagation within said body on a common plane of said body, said common plane making substantially a Bragg angle with said collimated laser beam propagating within said body;
    beam deflecting means arranged in the path of said outgoing laser beams in a second deflection plane to provide line scanning in an image plane;
    recording means with a light sensitive surface in said image plane for recording the light channel information of said intensity modulated and deflected outgoing laser beams impinging on said image plane; and
    a control unit for controlling said acousto-optical light intensity modulator in accordance with data and signals to be recorded comprising a plurality of control stages, each being coupled to a respective one of said transducer segments for exciting segment with a signal composed of at least one amplitude modulated very high frequency carrier, each of said control stages comprising at least one very high frequency oscillator for producing a respective one of said carriers being associated with one of said information channels, and means for modulating the carrier signals of each of said oscillators to produce intensity modulation of the outgoing beams associated with the information channels corresponding to the carriers of said stage.

2. The apparatus defined in claim 1 wherein said second deflection plane is substantially normal to said first deflection plane.

3. The apparatus defined in claim 2 wherein each of said control stages comprises a plurality of said oscillators, each producing a separate carrier frequency.

4. The apparatus defined in claim 3 wherein said modulating means comprises gating means connected in series with the output of said oscillators and having respective control inputs for receiving respective channel information signals, and an adder having respective inputs coupled to the outputs of said gating means adapted to linearly superimpose said gated carriers to produce said exciting signal of said control stage.

5. The apparatus defined in claim 4 wherein dynamic level equalizers are provided in the respective paths between the oscillator outputs and the inputs of said adder.

6. The apparatus defined in claim 1 wherein said body is composed of a tellurium dioxide monocrystal.

7. The apparatus defined in claim 6 wherein said linear array of separately controllable transducer segments is arranged on a common crystal plate extending normal to the direction of said monocrystal defined by the crystalline indices of (110), and the direction of said linear array of the separately controllable transducers extending parallel to the direction of said monocrystal defined by the crystalline indices of (001).

* * * * *